US008699817B2

(12) United States Patent
Zhang et al.

(10) Patent No.: US 8,699,817 B2
(45) Date of Patent: Apr. 15, 2014

(54) RECONSTRUCTION OF PHASED ARRAY DATA

(75) Inventors: Jingdan Zhang, Plainsboro, NJ (US); Moritz Michael Knorr, Bonn (DE); Guozhen Li, Shandong (CN); Shaohua Kevin Zhou, Plainsboro, NJ (US); El Mahjoub Rasselkorde, Pittsburgh, PA (US); Waheed A. Abbasi, Murrysville, PA (US); Michael J. Metala, Murrysville, PA (US)

(73) Assignees: Siemens Corporation, Iselin, NJ (US); Siemens Energy, Inc., Orlando, FL (US)

( * ) Notice: Subject to any disclaimer, the term of this patent is extended or adjusted under 35 U.S.C. 154(b) by 201 days.

(21) Appl. No.: 13/245,003

(22) Filed: Sep. 26, 2011

(65) Prior Publication Data
US 2012/0128266 A1 May 24, 2012

Related U.S. Application Data

(60) Provisional application No. 61/387,155, filed on Sep. 28, 2010.

(51) Int. Cl.
G06K 9/36 (2006.01)

(52) U.S. Cl.
USPC .......................................................... 382/276

(58) Field of Classification Search
USPC .................. 382/276, 285, 128, 132, 154, 260
See application file for complete search history.

(56) References Cited

U.S. PATENT DOCUMENTS

| 5,408,884 | A | 4/1995 | Sabourin |
| 5,526,442 | A * | 6/1996 | Baba et al. ..................... 382/132 |
| 6,301,496 | B1 * | 10/2001 | Reisfeld ......................... 600/407 |
| 7,302,851 | B2 | 12/2007 | Czerw et al. |
| 7,328,620 | B2 | 2/2008 | Howard et al. |
| 7,500,396 | B2 | 3/2009 | Bentzel |
| 7,606,445 | B2 | 10/2009 | Howard |
| 2009/0307628 | A1 | 12/2009 | Metala et al. |
| 2010/0278439 | A1 * | 11/2010 | Lennington et al. ............ 382/209 |
| 2011/0109627 | A1 | 5/2011 | Zhang et al. |

OTHER PUBLICATIONS

Ludvigsen, "Real-time GPU Based 3D Ultrasound Reconstruction and Visualization", Master of Science in Computer Science, Jun. 17, 2010, pp. 1-127.
San Jose-Estepar at al, "A theoretical framework to three-dimensional ultrasound reconstruction from irregularly sampled data", Ultrasound in Medicine and Biology, New York, NY, vol. 29, No. 1, Feb. 1, 2003, pp. 263-277.

(Continued)

Primary Examiner — Yon Couso
(74) Attorney, Agent, or Firm — Michele L. Conover

(57) ABSTRACT

An image reconstruction method includes receiving volume data comprising a plurality of sampling points, determining a first conditioning of the sampling points suppressing low amplitudes and conserving maximum amplitudes, determining a second conditioning of the sampling points wherein an influence of a sampling point depends on its distance to a grid point in a sampling grid, determining a kernel comprising a plurality of weighting functions for the first conditioning and the second conditioning to determine an energy spread of each of the plurality of sampling points without determining a shape or size of the kernel, and outputting a reconstructed volume according to the energy spread of each of the plurality of sampling points.

15 Claims, 6 Drawing Sheets

(56) References Cited

OTHER PUBLICATIONS

Gobbi et al., Interactive Intra-operative 30 ultrasound reconstruction and visualization, Lecture Notes in Computer Science/MICCAI 2000, Springer, DE, vol. 2489, Jan. 1, 2002, pp. 156-163.

Rohling et al., "A comparison of freehand three-dimensional ultrasound reconstruction techniques", Medical Image Analysis, vol. 3, No. 4, Dec. 1, 1999, pp. 339-359.

International Search Report and Written Opinion dated Dec. 28, 2011.

* cited by examiner

RECONSTRUCTION OF PHASED ARRAY DATA

CROSS-REFERENCE TO RELATED APPLICATION

This is a non-provisional application claiming the benefit of U.S. provisional application Ser. No. 61/387,155, filed Sep. 28, 2010, the contents of which are incorporated by reference herein in their entirety.

BACKGROUND

1. Technical Field

The present disclosure relates to image reconstruction, and more particularly to a method for reconstructing phased array data.

2. Discussion of Related Art

In a phased array a multitude of ultrasonic transducers are arranged in an array. Each of the transducers in the array can be driven individually. By using delay and amplitude patterns the array of transducers can be used to form a specific beam. The used delay pattern and amplitude pattern (also called laws) are often grouped in the term focal law. Different focal laws can be used to form beams which are not only focusing on points in different distances but also to form beams at different angles. The phased array device captures a reflected signal as 2-dimensional (2D) B-scan mode. In a common phased array based Non-Destructive Evaluation (NDE), a large number of 2D images are captured. In order to visualize and analyze the data efficiently, a 3-dimensional (3D) volume reconstruction is needed to fuse these 2D images.

BRIEF SUMMARY

According to an embodiment of the present disclosure, an image reconstruction method includes receiving volume data comprising a plurality of sampling points, determining a first conditioning of the sampling points suppressing low amplitudes and conserving maximum amplitudes, determining a second conditioning of the sampling points wherein an influence of a sampling point depends on its distance to a grid point in a sampling grid, determining a kernel comprising a plurality of weighting functions for the first conditioning and the second conditioning to determine an energy spread of each of the plurality of sampling points without determining a shape or size of the kernel, and outputting a reconstructed volume according to the energy spread of each of the plurality of sampling points.

According to an embodiment of the present disclosure, an image reconstruction method includes receiving volume data comprising a plurality of sampling points, determining a first conditioning of the sampling points suppressing low amplitudes and conserving maximum amplitudes, determining a second conditioning of the sampling points wherein an influence of a sampling point depends on its distance to a grid point in a sampling grid, and determining a kernel comprising a plurality of weighting functions for a convolution of the first conditioning and the second conditioning to determine an energy spread of each of the plurality of sampling points. Determining the kernel further includes reconstructing the volume data by setting each of the sampling points to a nearest grid point, and filtering the volume data according to the energy spread of each of the plurality of sampling points. The method further including outputting a reconstructed volume according to the energy spread of each of the plurality of sampling points.

According to an embodiment of the present disclosure, a system for performing a method of image reconstruction. The system includes a processor configured to reconstruct an image from volume data, the processor determining a first conditioning of the sampling points suppressing low amplitudes and conserving maximum amplitudes, determining a second conditioning of the sampling points wherein an influence of a sampling point depends on its distance to a grid point in a sampling grid, determining a kernel comprising a plurality of weighting functions for the first conditioning and the second conditioning to determine an energy spread of each of the plurality of sampling points without determining a shape or size of the kernel, and outputting a reconstructed volume according to the energy spread of each of the plurality of sampling points, and a memory configured to store the reconstructed volume.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

The phased array is an ultrasound technology for non-destructive evaluation applications. As data captured from one position only describes flaw properties under a specific angle of incidence, and non-diffuse flaws might not be captured from this angle, the flaw information needs to be captured from different positions.

According to an embodiment of the present disclosure, a 3D reconstruction for phased array based non-destructive evaluation applications enables analysis of data using fused information from multiple capture positions and provides a basis for automatic flaw detection and shape estimation.

Embodiments of the present disclosure include a comparatively accurate reconstruction method using splatting, a comparatively fast reconstruction method for data browsing, and a parallel reconstruction method. Embodiments of the present disclosure further include methods for handling volumes exceeding a memory and volume renderer's limit.

Figure 1A:
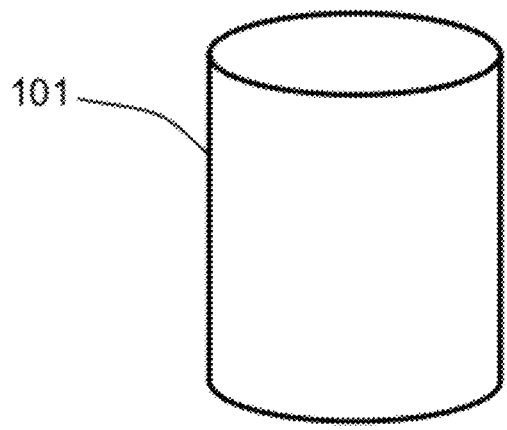
FIG. 1A illustrates an exemplary solid rotor according to an embodiment of the present disclosure.

In this description, a solid rotor inspection, for example, inspection of a turbine rotor, is used to demonstrate embodiments of the present disclosure. It may be assumed that the position and orientation under which the data is captured are known, and that no further registration correction is needed. Further, it may be assumed that an inspected rotor 101 (see FIG. 1A) is captured densely at circumferential angles. In addition, it may be assumed that the data are rectified so that signal echo amplitudes do not depend on the distance but only on the size, shape, and reflection properties of the reflecting rotor. The amplitude information can therefore directly be used for a Distance-Weight-Gain flaw sizing method.

Figure 1B:
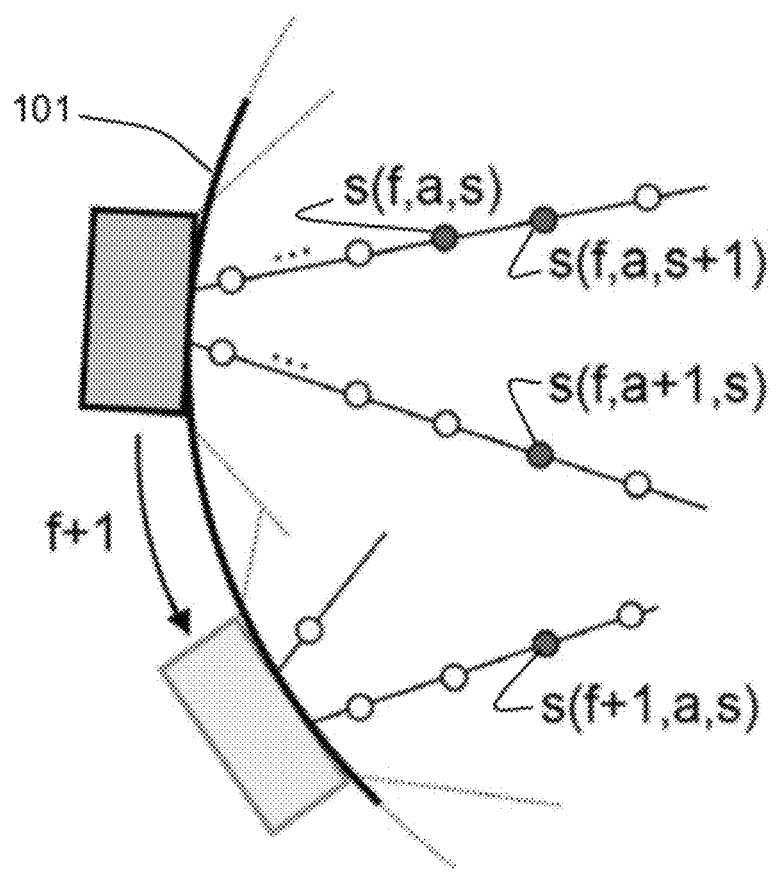
FIG. 1B illustrates a solid rotor scan pattern according to an embodiment of the present disclosure.

FIG. 1B shows the notation used for inspection of the solid rotor 101. Each sampling point $\underline{p}_s$ is determines by three parameters, a fan number f, an A-scan number a, and a sampling point number s. The amplitude value of the sampling point is given by s(f,a,s), where $\underline{p}_s=(f,a,s)^T$. Each fan includes several A-scans with different orientations that have a constant angle interval. This information can be used to determine a region of influence of each sampling point s(f,a,s). Cartesian grid coordinates of a reconstructed volume are named i, j and k where $\underline{p}_g=(i,j,k)^T$. Exemplary methods described herein may be applied to other NDE applications with different scan patterns.

According to an embodiment of the present disclosure, data fusion describes a process and manner in which the information from sampling points is fused in the 3D volume. As many 3D kernels may overlap at the same position, data fusion achieves a reasonable result. Different fusion methods may be used, including an average approach and a maximum approach. Information given by sampling points whose extent fall into the same region may be fused. The information given by the sampling points describes the reflection properties at different angles. In the information, high amplitudes indicate a flaw or crack boundary. From these considerations different approaches may be applied, including an average approach and a maximum approach.

A maximum method suppresses low amplitudes and conserves a maximum within a certain region. A maximum method may be expressed by the following equation:

$$v_{max}(i,j,k) = {}_{s(f,a,s)}^{argmax}(s(f,a,s) \cdot w_{max,f,a,s}(i,j,k)) \quad (1)$$

In the average method the influence of a sampling point depends on its distance to a grid point. The average method may be expressed by the following equation:

$$v_{avg}(i,j,k) = \frac{\sum_{f,a,s} s(f,a,s) \cdot w_{avg,f,a,s}(i,j,k)}{\sum_{f,a,s} w_{avg,f,a,s}(i,j,k)} \quad (2)$$

Weighting functions $w_{max,f,a,s}(i,j,k)$ and $w_{avg,f,a,s}(i,j,k)$ determine an energy spread of each sampling point. The energy spread of each sampling point is the influence of each sampling point in the reconstructed volume, the average method and the maximum method, respectively.

Figure 2A:
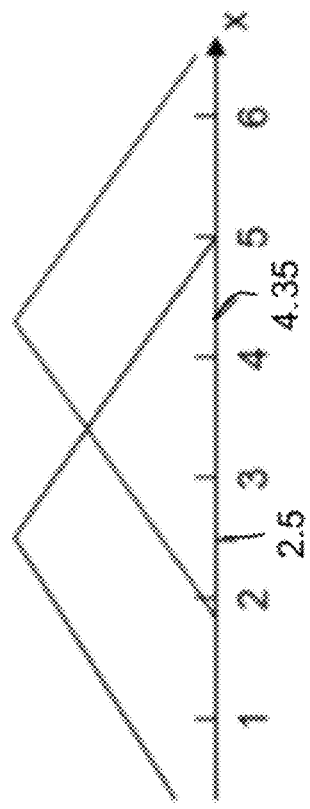
FIG. 2A shows two sampling points according to an embodiment of the present disclosure.
Figure 2B:
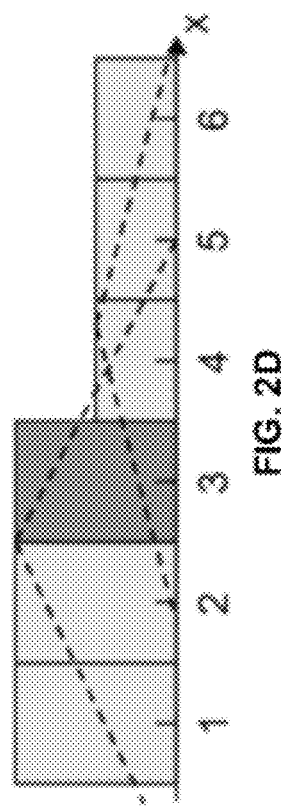
FIG. 2B shows weighted kernels at the sampling points of FIG. 2A according to an embodiment of the present disclosure.
Figure 2C:
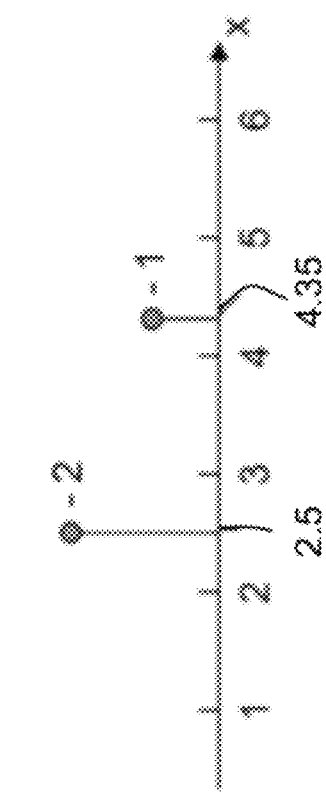
FIGS. 2C-D show respective reconstructions of the 1D signal of FIG. 2A according to an embodiment of the present disclosure.
Figure 2D:
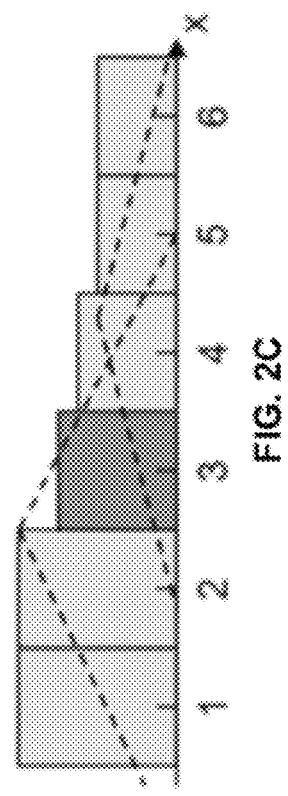

Referring to an exemplary fusing, consider the case of two triangular weighting functions inserted at two sampling points located at 2.5 and 4.35 with amplitudes 2 and 1, respectively. FIGS. 2A-D demonstrate different behaviors of the average type method and the maximum type method based on a 1-dimensional (1D) signal. Referring to an exemplary fusing, consider the case of two triangular weighting functions inserted at two sampling points located at 2.5 and 4.35 with amplitudes 2 and 1, respectively. FIGS. 2C and 2D show the result of the average type method and the maximum type method, respectively. The result value at x=3 is either 1.635 or 2.0 depending on the fusion types.

According to an embodiment of the present disclosure, a 3D volume reconstruction by splatting includes resampling a captured signal to a 3D regular grid. The splatting includes sampling raw data using an irregular grid and resampling the raw data to a regular grid. The splatting includes a reconstruction filter selected to substantially prevent undersampling, oversampling, and holes in the reconstructed volume. The splatting distributes energy of a sampling point in a predefined range and creates a continuous energy distribution, which can be sampled to a regular grid. It should be noted that a continuous energy distribution need not be created in a case where a contribution of each sampling point to a grid point may be determined.

Splatting is the process of distributing the energy of a sampling point into the volume space. According to an embodiment of the present disclosure, splatting is used to reconstruct a 3D volume for flaw detection and analysis. The splatting kernels may be determined based on the scan pattern designed for a specific NDE application. This approach may be used for rectilinear grids, irregular and regular grids using stochastic resampling, direct volume rendering of irregular grids using an elliptical weighted average splatting approach (EWA), etc. Direct volume rendering puts a 3D size and shape adaptive kernel at every sample point that extends the energy in the 3D space. The 3D kernel is integrated along the axis that is perpendicular to the image plane, resulting a 2D kernel or footprint.

In a method implementing equations 1 and 2, the whole data set s(f,a,s) is needed for evaluation at each voxel $(i,j,k)^T$. In some cases the data set of the raw data is larger than that of the final volume. The method therefore leads to an access of all parts of a data set, which may not be cached due its size and may therefore slow down the reconstruction speed. Further, the extent of the function is not infinite as in theory, and thus only a certain part of the data is needed to reconstruct a certain voxel. The determination of the needed sampling points is not a trivial task, e.g., as the arbitrary constellation of A-scans.

A refinement of the method implementing equations 1 and 2 includes defining buffers, a first buffer for the weighted sampling point amplitudes and a second buffer for the weights, namely $a_{avg/max,f,a,s}(i,j,k)$ and $w_{avg,f,a,s}(i,j,k)$. For every sampling point s(f,a,s) the corresponding region is defined where the kernel is not truncated. Within this region the buffer values are changed. For the maximum type method the procedure is similar as that in equation 1. That is the grid points i, j, k change and the sampling coordinates f, a, s stay the same. Additionally the weight of $w_{max,f,a,s}(i,j,k)$ is stored in $w_{max}(i,j,k)$ and the result of the product $s(f,a,s) \cdot w_{max,f,a,s}(i,j,k)$ is stored in $a_{max}(i,j,k)$, so that it does not have to be determined for each comparison.

The buffer values of the average type method may be determined as follows. For each grid point within the truncated kernel region, the buffer values are increased.

$$a_{avg}(i,j,k) \overset{+}{=} s(f,a,s) \cdot w_{avg,f,a,s}(i,j,k)) \quad (3)$$

$$w_{avg}(i,j,k) \overset{+}{=} w_{avg,f,a,s}(i,j,k))$$

Afterwards, the final voxel value may be given by:

$$v_{avg/max}(i,j,k) = \begin{cases} \dfrac{a_{avg/max}(i,j,k)}{w_{avg/max}(i,j,k)}, & w_{avg/max}(i,j,k) > 0 \\ 0, & w_{avg/max}(i,j,k) \le 0 \end{cases} \quad (4)$$

In volume rendering and resampling, different approaches may be applied to define a method of treating the data. These approaches include forward and backward mapping.

A backward mapping maps the image sample positions into the data space, by searching the nearest sample positions in the data space. A forward mapping maps the data to the image space by identifying the image space sample positions that are affected by a data space sampling position.

According to an embodiment of the present disclosure, a mapping uses condition dependent kernels for each sampling point and data fusion, which is a forward directed procedure, whereas the method implementing equations 1 and 2 is a backward directed approach.

Referring now to the Gaussian kernel and splatting, a reconstruction method uses a weighting function $w_{f,a,s}(i,j,k)$. The weighting functions in equations 1, 2 and 3 are named max and avg. Another weighting function describes the region and strength of the influence of each sampling point $s(f,a,s)$ in the reconstructed volume. Splatting may be used to distribute the energy in the volume. The weighting function, also known as a kernel if truncated, may be given by:

$$w_{f,a,s}(\underline{p}_g) = \frac{1}{(2\pi)^{\frac{3}{2}} \cdot |\Sigma|^{\frac{1}{2}}} e^{-\frac{1}{2}\left((R_{f,a}^{-1} \cdot (\underline{p}_g - \underline{\mu}_{f,a,s}))' \cdot \Sigma_i^{-1} \cdot (R_{f,a}^{-1} \cdot (\underline{p}_a - \underline{\mu}_{f,a,s}))\right)} \quad (5)$$

$$\Sigma_{f,a,s} = \begin{bmatrix} \sigma_{i,f,a,s}^2 & 0 & 0 \\ 0 & \sigma_{j,f,a,s}^2 & 0 \\ 0 & 0 & \sigma_{k,f,a,s}^2 \end{bmatrix} \quad (6)$$

where $\underline{\mu}_{f,a,s}$ is a position of the sampling point $s(f,a,s)$ in grid coordinates. And $R_{f,a}$ describes the orientation of the A-scan defined by f and a. $\Sigma_{f,a,s}$ determines the shape and ratio of the Gaussian function.

Referring to the kernel extent and aliasing, the kernel extent is important to prevent holes, aliasing, and over-blur. FIG. 1 shows an A-scan with one kernel.

The sampling along the A-scan axis may be dense, whereas the distance between two neighboring A-scans may be about ten to one hundred times larger. The kernel size may be chosen, for example, to be twice the length to the neighboring A-scan or sampling point in each dimension.

Figure 3:
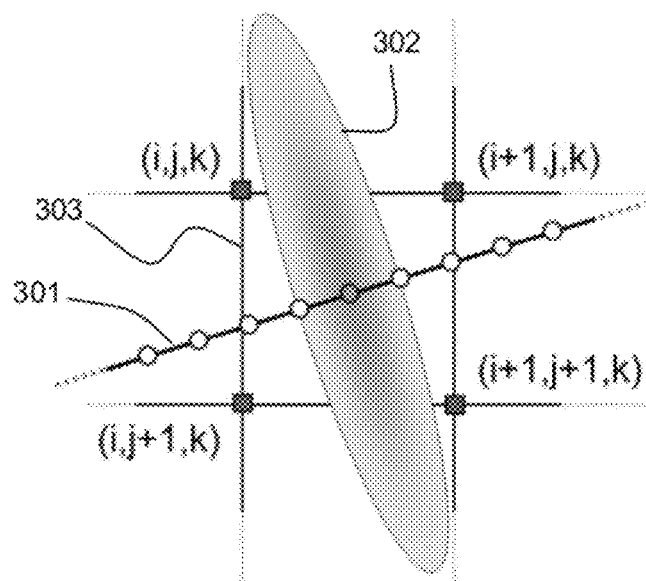
FIG. 3 shows a dense sampling along an A-scan according to an embodiment of the present disclosure.

FIG. 3 shows how a dense sampling along an A-scan 301 may lead to aliasing and allow some kernels, e.g., 302, fall through the grid 303. This is disadvantageous because some, and not all, sampling points will be represented in the result. In volume rendering this problem may be solved by extending the kernel size or adding the contribution to the nearest neighboring voxel. In signal processing, a signal may be low pass filtered to prevent aliasing during the resampling process. According to an embodiment of the present disclosure, the kernel extent is enlarged in those dimensions where it might fall through the grid.

A trade-off may be made between an improved visibility of details (average type approach) and conservatism (maximum type approach). For example, flaws that are only visible from certain angles, e.g., the flat bottom wholes, might be suppressed by selecting an appropriate balance between the average type approach and the maximum type approach.

According to an embodiment of the present disclosure, the exemplary reconstruction method presented above (referred to as an accurate reconstruction method) provides comparatively high reconstruction quality. The accurate reconstruction method realizes a computation cost of determining kernel shape and size adaptively.

Figure 4A:
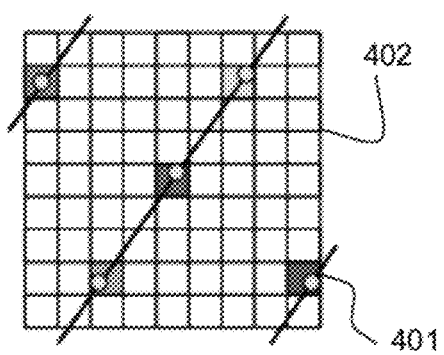
FIGS. 4A-B illustrate a fast reconstruction approach according to an embodiment of the present disclosure.
Figure 4B:
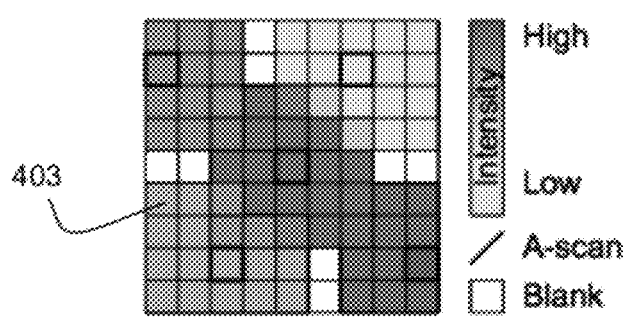

According to an embodiment of the present disclosure, a fast method includes putting the sampling points 401 into the volume voxel 402 (FIG. 4A). That is, sample point values may be set is a grid to a nearest grid point. A fusing (e.g., convolution of the average method and the maximum method) may be performed in case of more than one sampling point per voxel. Further, a kernel with fixed size is applied to every voxel to spread the sampling points energy 403 (FIG. 4B). That is, the image may be filtered using a weighted filter, such as a convolution filter. The result can be interpreted as a blur of the sample points.

According to an embodiment of the present disclosure, a fast method does not determine the kernel shape and size adaptively. The reconstruction time using the fast reconstruction type is (depending on the kernel type) less than about 1/100 of the time for the accurate method.

Figure 4C:
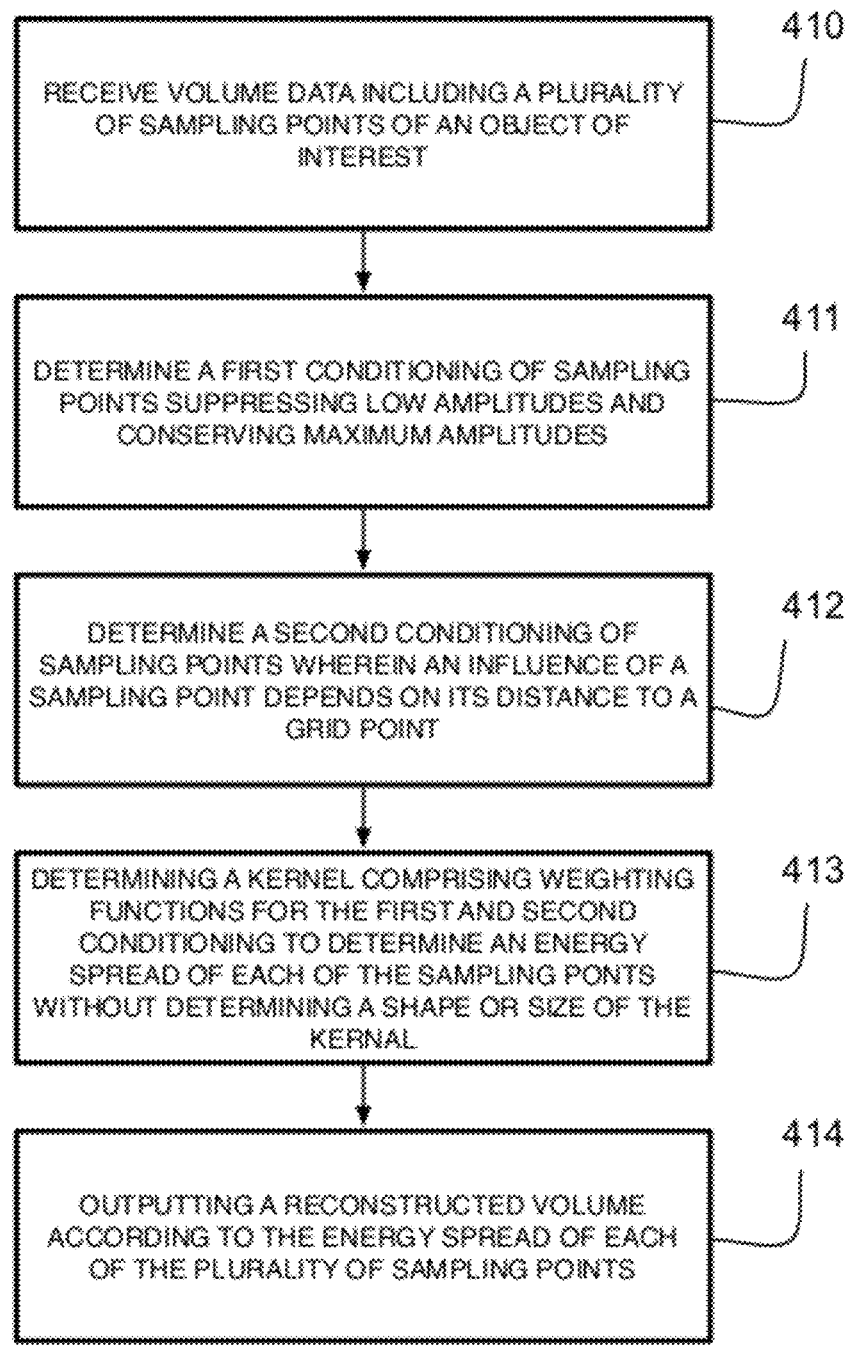
FIG. 4C is a flow diagram of a fast reconstruction approach according to an embodiment of the present disclosure.

Referring now to FIG. 4C, given volume data for the object of interest (e.g., solid rotor) 410, a first conditioning of the sampling points is determined suppressing low amplitudes and conserving maximum amplitudes 411 and a second conditioning of the sampling points is determined wherein an influence of a sampling point depends on its distance to a grid point 412. The method includes determining a kernel comprising a plurality of weighting functions for the first conditioning and the second conditioning to determine an energy spread of each of the plurality of sampling points without determining a shape or size of the kernel 413. A reconstructed volume according to the energy spread of each of the plurality of sampling points 414.

According to an embodiment of the present disclosure, a fast method can be used to browse the reconstructed volume for identifying regions-of-interest (ROIs), which might contain flaws. The identified ROIs then can be reconstructed using the accurate approach to reveal detailed flaw characters.

Figure 5:
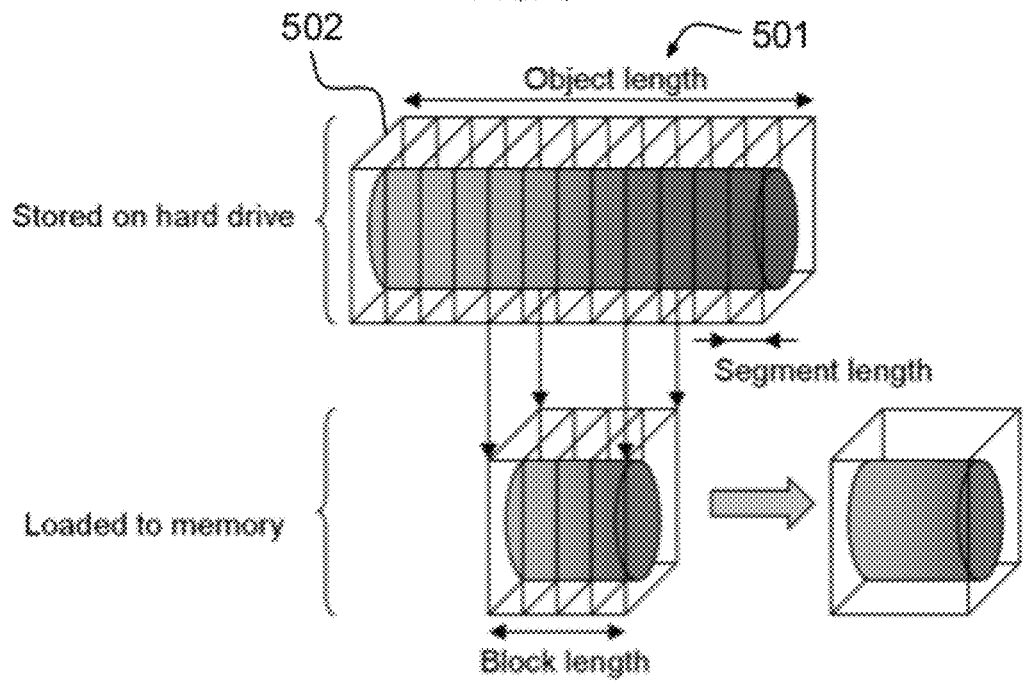
FIG. 5 illustrates a volume segmentation according to an embodiment of the present disclosure.

The axial length of a reconstructed volume may be large due to the length of the inspected rotor. This may cause a problem in visualization, since a volume rendering method can only render a volume with a limited size due to constrained computer memory. According to an embodiment of the present disclosure, only a part of the reconstructed volume is render at a given time. Referring to FIG. 5, the volume may be divided along an axial direction (object length) 501 into segments 502. A volume renderer may be given a fixed number of segments to display. The segments may be stored on a hard drive and may be loaded to memory as a block when needed.

The segmented volume may be visualized as a table of channel angle versus skew angle. By clicking on a cell in the first column or on a column header several channels can be selected or deselected at the same time. Colors in the table may indicate the contribution of the channel to the current volume. For example, black may indicate that the channel does not contribute because its A-scans do not intersect with the volume. The selected channels may be used for the reconstruction and 3D visualization. The table will be generated automatically based on the channels.

Figures 6A, 6B:
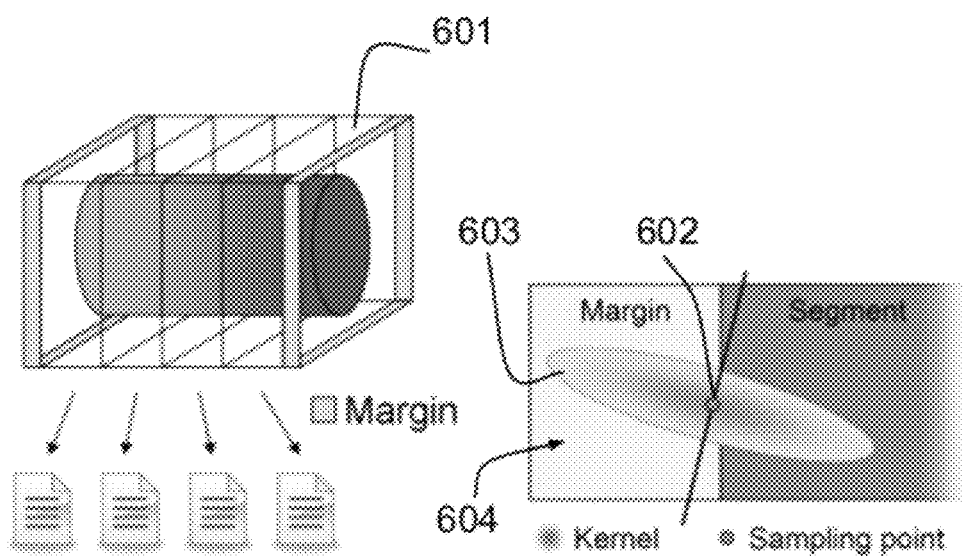
FIG. 6A illustrates a reconstruction of segments according to an embodiment of the present disclosure.
FIG. 6B illustrates a reconstruction of a margin according to an embodiment of the present disclosure.

The limitation of the computer memory may also exist in data reconstruction. In this case, reconstruction may be limited to one or more segments 601 at a time as shown in FIG. 6A. Depending on the size of the available memory, a specific number of segments may be reconstructed together. This may be more efficient than reconstructing one segment at a time. Margins may be used to avoid cut offs of kernels, which can introduce a discontinuity between two consecutive segments.

The concept of margin is illustrated in FIG. 6B. The kernel 602 of a sampling point 603 that lies outside of a sub-volume can stretch into the sub-volume. Therefore the sampling points within a margin 604 around the sub-volume should be taken into account when reconstructing the sub-volume. The margin length has to be at least half the size of the largest kernel width. By including margins, horizontal discontinuities in the images may be substantially avoided.

In view of the foregoing, methods described herein may handle an arbitrarily large volume, where the reconstruction process may be divided into separate tasks.

Parallel processing may be used to speed up volume reconstruction. In a paralyzed application a task is divided into several threads. Typically, a multithreaded solution incurs some overhead. The multithreaded solution may be preferable if the time required by a single thread is greater than a sum of the time required by multiple threads and the time required by overhead operations.

Figure 7:
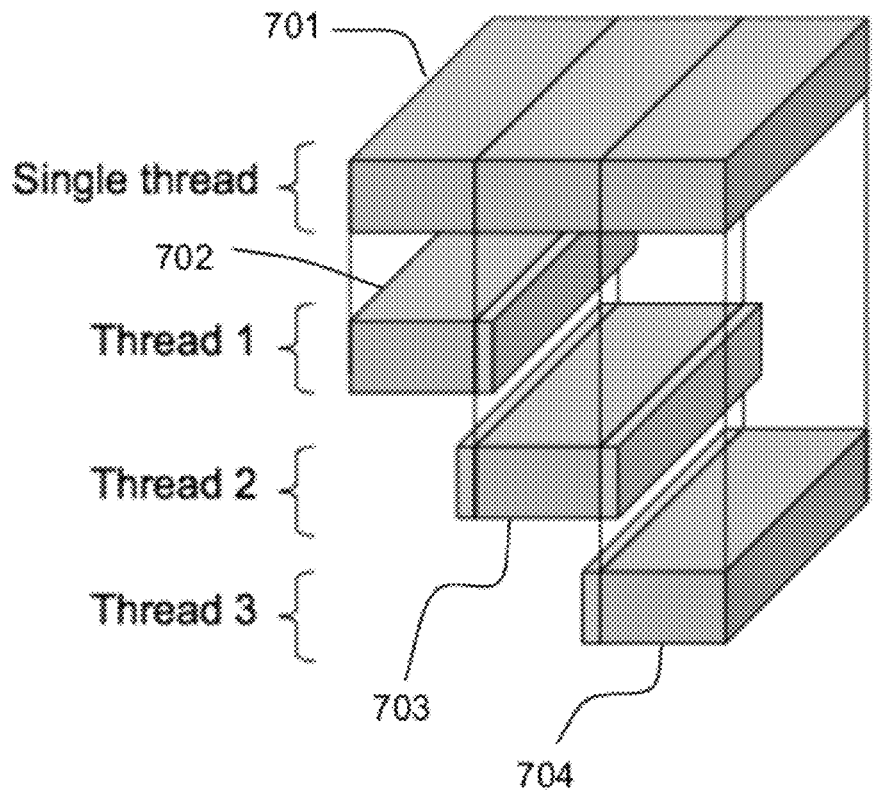
FIG. 7 illustrates a reconstruction Divide the volume into sub-volumes each of which is reconstructed by a thread.

Depending on the number of threads $n_{threads}$, the volume may be separated into $n_{threads}$ sub-volumes during reconstruction. Each thread reconstructs a respective sub-volume. FIG. 7 shows a volume separated into 3 threads (e.g., $n_{threads}=3$). As shown in FIG. 7, the volume 701 is divided into sub-volumes 702-704 each of which is reconstructed by a thread. In this case no critical section are needed as each thread only works on its part of the volume.

An exemplary computer system may comprise an Intel Xeon 5120 CPU (@1.86 Ghz) with four cores. Table 1 shows exemplary image reconstruction times using the exemplary computer system and an exemplary fast reconstruction method with different kernel sizes. The number of threads should not be larger than the number of cores.

TABLE 1

Speed-up
(resolution 0.037 inch/voxel length, fast reconstruction method)

| Kernel size | One thread [sec.] | Two threads [sec.] | Speed-up [%] (Two threads) | Four Threads [sec] | Speed-up [%] (Four Threads) |
| --- | --- | --- | --- | --- | --- |
| 1 × 1 × 1 | 52.8 | 35.4 | 49.15 | 26.9 | 96.3 |
| 3 × 3 × 3 | 56.6 | 37.3 | 51.7 | 28.4 | 99.2 |
| 5 × 5 × 5 | 67.7 | 43.2 | 56.7 | 32.6 | 107.7 |
| 7 × 7 × 7 | 90.6 | 54.6 | 65.9 | 40.1 | 125.9 |
| 9 × 9 × 9 | 127.3 | 74.0 | 72.0 | 53.5 | 137.9 |
| 11 × 11 × 11 | 184.6 | 104.5 | 76.7 | 73.0 | 152.5 |
| 13 × 13 × 13 | 268.7 | 148.4 | 81.1 | 103.7 | 159.1 |
| 15 × 15 × 15 | 381.3 | 210.6 | 81.1 | 145.5 | 162.1 |

In view of the foregoing, image reconstruction methods are described for phased array based NDE applications using phased array data captured from a solid rotor inspection. Exemplary embodiments include an accurate reconstruction method based on the splatting principle, a fast reconstruction method for data browsing, and parallel reconstruction for volumes that exceed memory and volume renderer's constraints.

Embodiments of the present disclosure support flaw sizing methods, including Time-of-Flight flaw sizing method (TOFE), and a Distance-Weight-Gain flaw sizing method.

It is to be understood that embodiments of the present disclosure may be implemented in various forms of hardware, software, firmware, special purpose processors, or a combination thereof. In one embodiment, a software application program is tangibly embodied on a non-transitory computer-readable storage medium, such as a program storage device or computer-readable storage medium, with an executable program stored thereon. The application program may be uploaded to, and executed by, a machine comprising any suitable architecture.

Figure 8:
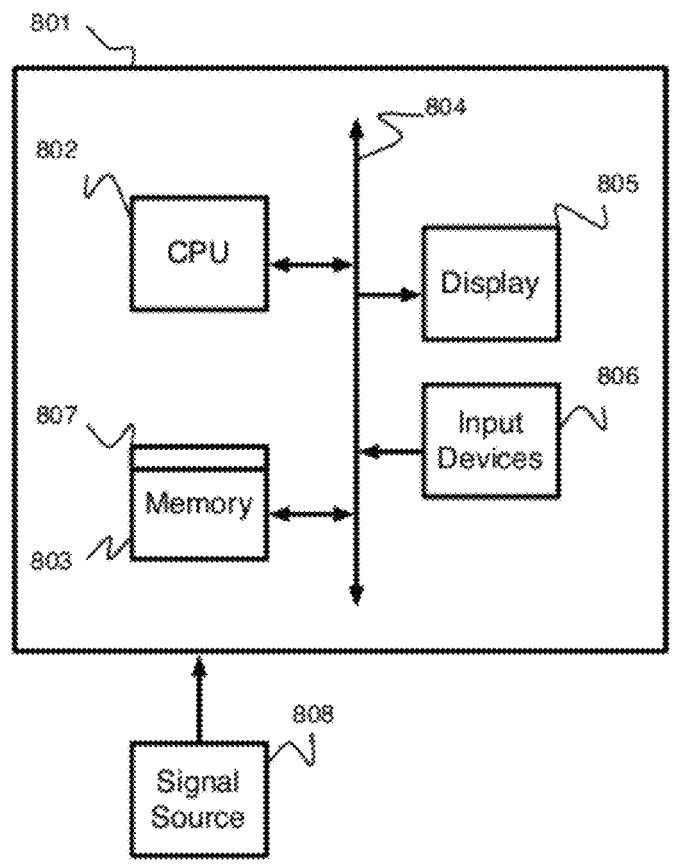
FIG. 8 shows an exemplary computer system for executing a method for volume reconstruction according to an embodiment of the present disclosure.

Referring to FIG. 8, according to an embodiment of the present disclosure, a computer system (block 801) for volume reconstruction includes, inter alia, a CPU (block 802), a memory (block 803) and an input/output (I/O) interface (block 804). The computer system (block 801) is generally coupled through the I/O interface (block 804) to a display (block 805) and various input devices (block 806) such as a mouse, keyboard, medical scanners, power equipment, etc. The display (block 805) may be implemented to display a reconstructed image. The support circuits can include circuits such as cache, power supplies, clock circuits, and a communications bus. The memory (block 803) can include random access memory (RAM), read only memory (ROM), disk drive, tape drive, etc., or a combination thereof. The present invention can be implemented as a module (block 807) of the CPU or a routine stored in memory (block 803) and executed by the CPU (block 802) to process input data (block 808). For example, the data may include image information from a camera, which may be stored to memory (block 803). As such the computer system (block 801) is a general purpose computer system that becomes a specific purpose computer system when executing the routine of the present disclosure.

The computer platform (block 801) also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for image reconstruction, it is noted that modifications and variations can be made by persons skilled in the art in light of the above teachings. It is therefore to be understood that changes may be made in embodiments of the present disclosure that are within the scope and spirit thereof.

What is claimed is:
1. An image reconstruction method comprising:
  receiving volume data comprising a plurality of sampling points;
  determining a first conditioning of the sampling points suppressing low amplitudes and conserving maximum amplitudes;

determining a second conditioning of the sampling points wherein an influence of a sampling point depends on its distance to a grid point in a sampling grid;

determining a kernel comprising a plurality of weighting functions for the first conditioning and the second conditioning to determine an energy spread of each of the plurality of sampling points without determining a shape or size of the kernel; and outputting a reconstructed volume according to the energy spread of each of the plurality of sampling points, wherein the image reconstruction method is performed by one or more computer processing systems.

2. The image reconstruction method of claim 1, wherein determining the kernel further comprises:

reconstructing the volume data by setting each of the sampling points to a nearest grid point; and filtering the volume data according to the energy spread of each of the plurality of sampling points.

3. The method of claim 1, further comprising:

defining a first buffer for weighted sampling point amplitudes; and defining a second buffer for a plurality of weights.

4. The method of claim 1, further comprising a forward mapping of each of the plurality of sampling points into a reconstructed volume.

5. The method of claim 1, further comprising a backward mapping of the volume data to find data influencing a given voxel.

6. An image reconstruction method comprising:

receiving volume data comprising a plurality of sampling points;

determining a first conditioning of the sampling points suppressing low amplitudes and conserving maximum amplitudes;

determining a second conditioning of the sampling points wherein an influence of a sampling point depends on its distance to a grid point in a sampling grid; and determining a kernel comprising a plurality of weighting functions for a convolution of the first conditioning and the second conditioning to determine an energy spread of each of the plurality of sampling points; and outputting a reconstructed volume according to the energy spread of each of the plurality of sampling points, wherein determining the kernel further comprises:

reconstructing the volume data by setting each of the sampling points to a nearest grid point; and filtering the volume data according to the energy spread of each of the plurality of sampling points, and wherein the image reconstruction method is performed by one or more computer processing systems.

7. The method of claim 6, further comprising:

defining a first buffer for weighted sampling point amplitudes; and defining a second buffer for a plurality of weights.

8. The method of claim 6, further comprising a forward mapping of each of the plurality of sampling points into a reconstructed volume.

9. The method of claim 6, further comprising a backward mapping of the volume data to find data influencing a given voxel.

10. A non-transitory computer program storage medium embodying instructions executable by a processor to perform a method for image reconstruction, the method comprising:

receiving volume data comprising a plurality of sampling points;

determining a first conditioning of the sampling points suppressing low amplitudes and conserving maximum amplitudes;

determining a second conditioning of the sampling points wherein an influence of a sampling point depends on its distance to a grid point in a sampling grid;

determining a kernel comprising a plurality of weighting functions for the first conditioning and the second conditioning to determine an energy spread of each of the plurality of sampling points without determining a shape or size of the kernel; and outputting a reconstructed volume according to the energy spread of each of the plurality of sampling points.

11. The storage medium of claim 10, wherein determining the kernel further comprises:

reconstructing the volume data by setting each of the sampling points to a nearest grid point; and filtering the volume data according to the energy spread of each of the plurality of sampling points.

12. The storage medium of claim 10, further comprising:

defining a first buffer for weighted sampling point amplitudes; and defining a second buffer for a plurality of weights.

13. The storage medium of claim 10, further comprising a forward mapping of each of the plurality of sampling points into a reconstructed volume.

14. The storage medium of claim 10, further comprising a backward mapping of the volume data to find data influencing a given voxel.

15. A system for performing a method of image reconstruction, the system comprising:

a processor configured to reconstruct an image from volume data, the processor determining a first conditioning of the sampling points suppressing low amplitudes and conserving maximum amplitudes, determining a second conditioning of the sampling points wherein an influence of a sampling point depends on its distance to a grid point in a sampling grid, determining a kernel comprising a plurality of weighting functions for the first conditioning and the second conditioning to determine an energy spread of each of the plurality of sampling points without determining a shape or size of the kernel, and outputting a reconstructed volume according to the energy spread of each of the plurality of sampling points; and a memory configured to store the reconstructed volume.

* * * * *